US009881261B2

(12) United States Patent
Subbaraj

(10) Patent No.: US 9,881,261 B2
(45) Date of Patent: Jan. 30, 2018

(54) SYSTEMS AND METHODS FOR REMOTE CHECK-IN

(71) Applicant: PAYPAL, INC., San Jose, CA (US)

(72) Inventor: Puvanenthiran Subbaraj, Tamil Nadu (IN)

(73) Assignee: PAYPAL, INC., San Jose, CA (US)

( * ) Notice: Subject to any disclaimer, the term of this patent is extended or adjusted under 35 U.S.C. 154(b) by 857 days.

(21) Appl. No.: 14/189,640

(22) Filed: Feb. 25, 2014

(65) Prior Publication Data

US 2015/0242764 A1    Aug. 27, 2015

(51) Int. Cl.
*G06Q 10/00* (2012.01)
*G06Q 10/02* (2012.01)
*H04L 29/08* (2006.01)

(52) U.S. Cl.
CPC .......... *G06Q 10/02* (2013.01); *H04L 67/025* (2013.01); *H04L 67/10* (2013.01); *H04L 67/125* (2013.01); *H04L 67/28* (2013.01)

(58) Field of Classification Search
CPC ....... G06Q 10/02; H04L 67/28; H04L 67/125; H04L 67/025; H04L 67/10
See application file for complete search history.

(56) References Cited

U.S. PATENT DOCUMENTS

| 8,635,117 | B1 | 1/2014 | Acuña-Rohter | |
|---|---|---|---|---|
| 2009/0327135 | A1* | 12/2009 | Nguyen | G06Q 20/40 705/44 |
| 2013/0185368 | A1 | 7/2013 | Nordstrom et al. | |
| 2013/0246218 | A1* | 9/2013 | Gopalan | G06Q 30/00 705/26.8 |
| 2015/0073980 | A1* | 3/2015 | Griffin | H04W 4/008 705/39 |

* cited by examiner

*Primary Examiner* — Minnah L Seoh
(74) *Attorney, Agent, or Firm* — Haynes and Boone, LLP

(57) ABSTRACT

Systems and methods are provided for facilitating remote check-in and associated proxy shopping operations. A proxy customer of a merchant may be a friend of a remote customer that is making a purchase at the merchant on behalf of the remote customer. A beacon may alert the proxy customer to check-in to the merchant. The proxy customer may forward the alert to the remote customer. The remote customer may request remote check-in responsive to the alert. A payment provider or service provider may perform a remote check-in of the remote customer and a proxy check-in of the proxy customer. When the proxy customer wishes to make a proxy purchase for the remote user, the merchant may verify the proxy customer's identity and charge the payment provider. The payment provider may then transfer funds from remote customer's account to the merchant's account.

15 Claims, 4 Drawing Sheets

SYSTEMS AND METHODS FOR REMOTE CHECK-IN

TECHNICAL FIELD

The present invention generally relates to electronic commerce and, more particularly, to systems and methods for remote check-in.

BACKGROUND

Consumers often visit stores, restaurants, and entertainment venues that offer services or products for the consumers. In some circumstances, a consumer will check in to a particular store, restaurant, or entertainment venue upon arrival at the store, restaurant, or entertainment venue to receive sales, discounts, or other advertisements. Additionally, a checked-in consumer is sometimes provided with the ability to complete a payment to the store, restaurant, or entertainment venue using an application on the consumer's mobile device. In this way, a consumer can be provided with customized service or offers and the ability to quickly and conveniently execute transactions. However, check-in services of this type are commonly only available to consumers who are physically co-located with the store, restaurant, or entertainment venue. This can be problematic for potential consumers for whom it is difficult or impossible to go to particular location and can result in the loss of availability of goods and services to the consumer and a related loss in sales for a merchant.

It would therefore be desirable to be able to provide systems and methods for facilitating remote check-in.

Figure 1:
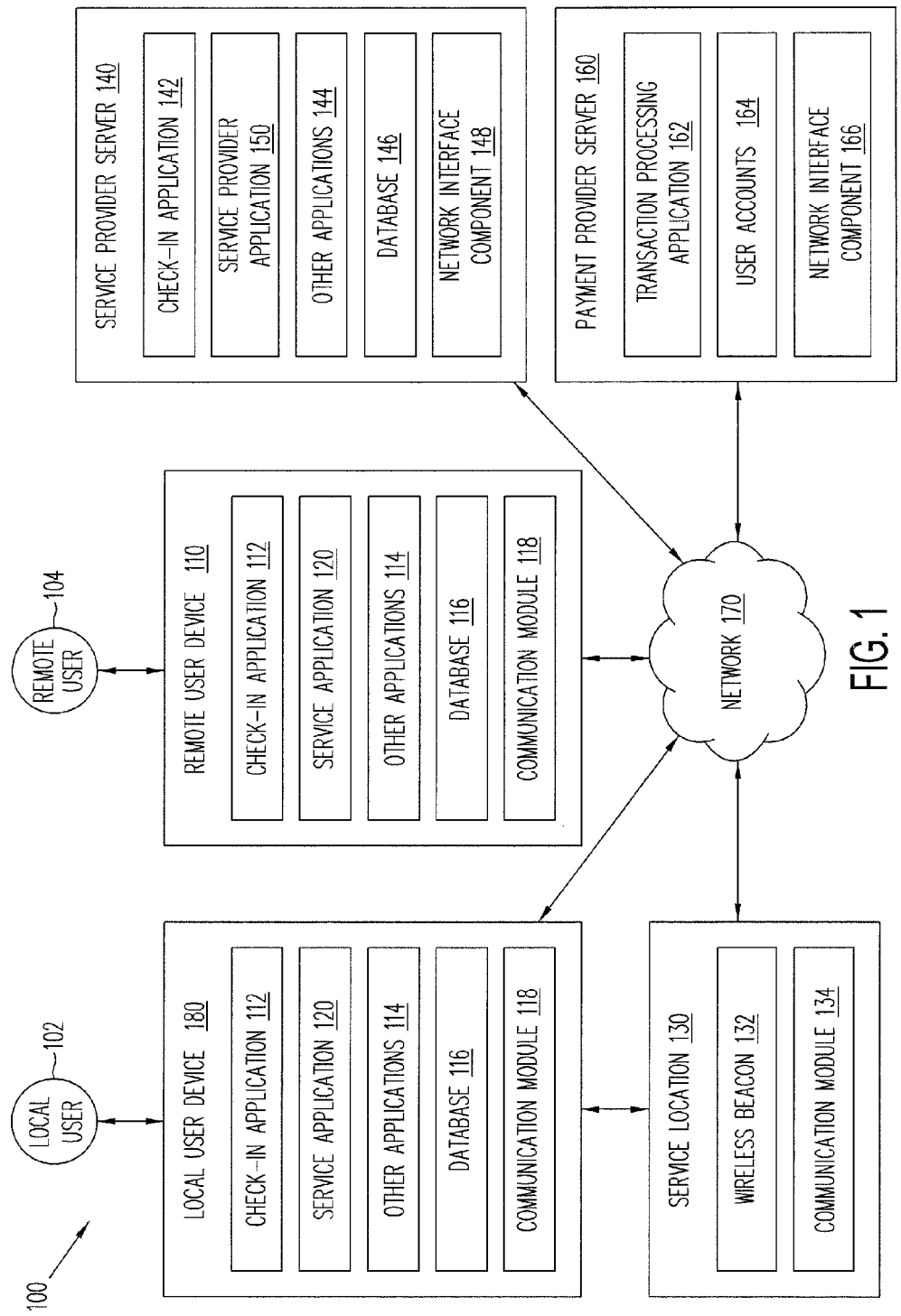
FIG. 1 is a block diagram of a networked system suitable for implementing remote check-in, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A service provider may include one or more locations where the service provider offers goods, products, services, or other items to users. In various embodiments, a service location may correspond to a merchant location offering products and/or services to the user.

Some users may visit a service location and check in with the service provider. A check-in of a user may be performed while the user is located at the service center using, for example, an electronic communication between a user device and a server of the service center (e.g., over a network such as the Internet), and/or electronic communication between the user device and a short range wireless beacon connection at the service center (e.g., a beacon associated with a payment provider or merchant). Checked-in users may receive in-person or electronic assistance in completing a transaction with the service provider, and/or may receive user-targeted offers, discounts, promotions, or other communications from the service provider. Transactions that the checked-in user may engage in may correspond to a payment for an item at a merchant, or may correspond to informational exchanges, updates, etc. that a service provider may offer (as examples).

Some users may check in to a service provider remotely using, for example, a proxy user at the service location. In various embodiments, a proxy user for a remote user may check-in at a service location on behalf of remote user. A proxy user (sometimes referred to herein as a proxy customer, a proxy shopper, or a local user) may be, according to an embodiment, a friend, a family member, an employee or any other associate of the remote user that is shopping and/or making a purchase at a merchant location on behalf of the remote user.

In one example usage scenario, a customer of a merchant that is located remotely from the merchant's location asks a friend to purchase an item for the customer at the merchant. When the customer's friend arrives at the merchant's location (e.g., a store), a beacon such as a payment provider beacon may alert the customer's friend to check-in using a mobile device of the friend. The customer's friend may forward the check-in alert to the customer (e.g., using Wi-Fi, cellular network or beacon communications technologies). The customer may accept a check-in offer associated with the forwarded check-in alert. The payment provider may perform a remote check-in operation for the customer (e.g., at a payment provider server and/or a merchant server) and perform a proxy check-in of the customer's friend to the merchant location on behalf of the customer. The merchant may, if desired, verify the customer friend's identity (e.g., using a photograph or other identifying information) and initiate a payment transaction for the customer by the customer's friend with the payment provider. The payment provider may then process the payment transaction by transferring funds from the customer's account to the merchant's account. In this way, a remote user can take advantage of the benefits of user check-in at various merchants and other service providers and a proxy user such as a friend, family member, employee, or other associate of the remote user can purchase products and/or services for the remote user using the remote user's funds for payment and without accessing any accounts of the proxy user.

Various locations provide short range wireless communications with a local user device such as a proxy user device, such as through Bluetooth Low Energy (BLE) beacon communications. A beacon may be disposed at a location and may communicate with the local user device to alert users such as proxy users and/or associated remote users of check-in services through their user device. The beacons may provide additional functionality, such as establishing a connection with a server entity to complete transactions, including check-in services. Additionally, the beacons may provide communication services to the local user device directly, including information stored on the beacons, and/or information from a device or server corresponding to the beacon.

The service location(s) may utilize short range wireless beacons to communicate with mobile user devices of the local users. The short range wireless beacons may employ BLE communications that emit a signal receivable by a local user device of a local user (e.g., a proxy user). The communication may include an identifier for the beacon. A local user device may passively monitor for BLE communications. When a local user device detects a BLE signal and verifies the identifier as belonging to a particular location such as a venue (e.g., a venue device and/or server), both the local user device and the beacon may ramp up in power and establish a connection. The connection may further enable the local user device and/or an associated remote user device of a remote user to communicate with a service provider device and/or server. The beacon may be connected to a networked device at the service location, or the beacon may include network functionality to communicate with the service provider server.

The service provider may access user information for the remote user and provide targeted assistance, products, and/or services to the local user based on the remote user information. In this way, a remote user and a service location may be able to take full advantage of the benefits of check-in services without the remote user travelling to the service location.

FIG. 1 is a block diagram of a networked system 100 suitable for implementing remote check-in, proxy check-in, and related proxy shopping processes, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 may include one or more users such as a local user 102 having a local user device 180 and a remote user 104 having a remote user device 110, a service location 130, a service provider server 140, and a payment provider server 160 in communication over a network 170. Local user 102 (e.g., a visitor to a service location) may utilize their corresponding local user device 180 to check-in to service provider server 140. Service location 130 may correspond to a location that provides goods, products, item, and/or other services to a user including travel, medical, or other services. Service provider server 140 may correspond to a general server for multiple service locations (e.g. a server for a merchant chain) or may be specific to only service location 130 (e.g. a server for a hospital, airport, etc.).

Check-in of local users 102 may be accomplished through a wireless beacon 132 at service location 130, through a social media application or website or by other check-in equipment. Local user 102 may be associated with remote user 104. For example, local user 102 may be a registered proxy shopper for remote user 104 (e.g., registered with service provider server 140 and/or payment provider server 160) or local user 102 may have contact information for remote user 104 for forwarding a check-in request. Local users such as local user 102 may check in for themselves or may check in as a proxy user for remote user 104. Remote user 104 may check in to service provider server 130 and/or payment provider server 160 remotely via, for example, local user 102. User information for local user 102 and/or remote user 104 (e.g., a purchase history or a check-in history at service location 130 or other services locations) may be obtained upon check-in.

User devices 110 and 180, service location 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Local user device 180 and remote user device 110 may be implemented using any appropriate hardware and software such as hardware and software configured for wired and/or wireless communication with wireless beacon 132 and/or service provider server 140. For example, in various embodiments, either or both of local user device 180 and remote user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although user devices are shown, each user device may be managed or controlled by any suitable processing device.

Local user device 180 and remote user device 110 may each include a check-in application 112, a service application 120, other applications 114, a database 116, and a communication module 118. Check-in application 112, service application 120, and other applications 114 may correspond to processes, procedures, and/or applications executable by a hardware processor, for example, a software program. In other embodiments, user device 110 may include additional or different software as required.

Check-in application 112 of local user device 180 may be used by local user 102 to establish a connection between that user device 180 and service location 130, service provider server 140, and/or payment provider server 160 for check-in such as proxy check-in of local user 102. Check-in application 112 of remote user device 110 may be used by remote user 104 to establish a connection between that user device 110 and local user device 180, service provider server 140, and/or payment provider server 160 for check-in such as remote check-in of remote user 104. A check-in application 112 may provide a general user device with the ability to function as a remote user device and/or a local user device as desired.

Check-in application 112 may correspond to an application available over the Internet for download from service provider server 140 and/or other server corresponding to service location 130. Check-in application 112 may be set up to receive short range wireless communications with wireless beacon 132 at service location 130 to complete a check-in process. For example, service location 130 may include infrastructure with wireless beacon 132 to communicate with local user device 180 and complete the check-in process with service provider server 140. Wireless beacon 132 may be configured to transmit an identifier for reception by local user device 180.

Check-in application 112 may execute in the background of an operating system. Check-in application 112 of local user device 180 may be configured to establish connections, using communication module 118 of that user device 180, with wireless beacon 132 at service location 130.

Proxy check-in of local user 102 with service provider server 140 and/or payment provider server 160 may correspond to a process to log in to a user account of local user 102 with service provider server 140 and/or payment provider server 160. In other embodiments, the proxy check-in may provide and/or verify the identity of local user 102, including transmission of an identifier for local user 102 and/or local user device 180. The check-in may be completed over network 170 with service provider server 140 and/or payment provider server 160. In such embodiments, check-in application 112 may correspond more generally to a browser application configured to communicate with service provider server 140 and/or payment provider server 160.

A connection between local user device 180 and wireless beacon 132 may be established with or without user input from user 102. For example, wireless beacon 132 may broadcast a token, such as a universally unique identifier (UUID), for reception by local use device 180. Check-in application 112 of local user device 180 may utilize communication module 118 of the local user device 180 to receive the token from wireless beacon 132. If check-in application 112 acknowledges the UUID as identifying service location 130, wireless beacon 132, and/or service provider server 140, check-in application 112 may transmit an identifier corresponding to user 102 and/or local user device 180 back to wireless beacon 132. Check-in application 112 may utilize communication module 118 to communicate with wireless beacon 132 (e.g., over near field communication, Bluetooth, Bluetooth Low Energy, radio, infrared, or other connection). The identifier from local user device 180 may include, be transmitted with, concatenated with, or otherwise bundled with the identifier received from wireless beacon 132.

Once a connection is established with wireless beacon 132, local user device 180 may be checked-in with service provider server 140 if the user 102 of that device has not previously been checked-in and/or may be provided with one or more options for proxy check-in for a remote user. The check-in process may then associate that user 102 with wireless beacon 132 used to check-in that user 102. In such embodiments, check-in application 112 of local user device 180 may utilize short range wireless communication with wireless beacon 132, such as near field communication, Bluetooth, Bluetooth Low Energy, radio, infrared, or other connection. Where wireless beacon 132 corresponds generally to service location 130, local user 102 may be associated with service location 130. However, in other embodiments wireless beacon 132 may correspond to a location, item (i.e., a product or good), and/or service at service location 130. Thus, local user 102 may be associated with that location, item, and/or service (e.g., a television sales section of a merchant, a departure area of an airport, a neonatal section of a hospital, etc.).

Local user 102 may be provided with the ability to check in and/or to forward a check-in alert to remote user 104. Remote user device 110 may receive the check-in alert from local user 102 (e.g., directly or via service provider server 140 or payment provider server 160). Check-in application 112 of remote user device 110 may provide the check-in alert to remote user 104. Remote user 104 may use check-in application 112 of remote user device 110 to request remote check in. Remote user 104 may then be remotely checked in to service provider server 140 and/or payment provider server 160.

Remote check-in of remote user 104 with service provider server 140 and/or payment provider server 160 may correspond to a process to log in to a user account of remote user 104 with service provider server 140 and/or payment provider server 160. In other embodiments, the remote check-in may provide and/or verify the identity of remote user 104, including transmission of an identifier for remote user 104 and/or remote user device 110. The remote check-in may be completed over network 170 with service provider server 140 and/or payment provider server 160. In some embodiments, check-in application 112 may correspond more generally to a browser application configured to communicate with service provider server 140 and/or payment provider server 160.

The remote check-in process may then associate remote user 104 with service location 130 and/or local user 102 to check-in remote user 104. Thus, remote user 104 may be associated with that location, item, and/or service (e.g., a television sales section of a merchant, a departure area of an airport, a neonatal section of a hospital, etc.) by proxy with local user 102.

Check-in application 112 of remote user device 110 of a checked-in remote user may receive information (e.g., maps, processes to request assistance from the service provider, product and/or service offers, discounts, product information, etc.) from service provider server 140. When remote user 104 is checked-in with service provider server 140, service provider server 140 may have access to an identifier of remote user device 110 and may therefore transmit information to remote user device 110 using that identifier over network 170.

Check-in application 112 of remote user device 110 may utilize communication module 118 of that device to pass user information for remote user 104 to service provider server 140, including user assistance preferences, user calendar information, user relationship information, user email information, user social media information, identifiers of user 104 and/or user device 110, a request for assistance, a request for a type of assistance, product preference information, service preference information, etc. Once check-in application 112 of remote user device 110 has completed a remote check-in with service provider server 140, remote user 104 may be recognized or identified by service provider server 140 and local user 102 may receive targeted assistance, product offers and/or service offers for remote user 104.

Service application 120 may be used, for example, to provide a convenient interface to permit users 102 and/or 104 to receive, request, and/or view targeted products and/or services. Service application 120 may correspond to an application specific to service location 130 and/or service provider server 140, such as an application downloadable over network 170 and/or through wireless beacon 132. However, in other embodiments, service application 120 may correspond more generally to any application configured to receive targeted assistance, product offers, and/or service offers, including a browser application.

Service application 120 may be configured to receive assistance, products offers, and/or service offers for service location 130. Service application 120 may also be configured to display the information. For example, service application 120 may display general information for service location 130, such as a map, merchant store offerings, remote-user-specific product or service locations, information desk locations, sales/coupons/rebates, or other general information. Additionally, service application 120 may use a location device and/or application of local user device 180, such as a GPS device and application, to locate local user 102 at a specific location at service location 130, and transmit the specific location to service provider server 140 for use in providing the targeted assistance, product offers and/or service offers to remote user 104 and/or to local user 102 for remote user 104. In other embodiments, the location of local user 102 may be determined based on a communication between local user device 180 with wireless beacon 132. In various embodiments, check-in application 112 and service application 120 of each user device may be incorporated in the same application so as to provide their respective features in one convenient application interface.

Each user device may include other applications 114 as may be desired in particular embodiments to provide features to that user device. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may include browser and/or mapping applications where the functions are not provided by check-in application 112 and/or service application 120. Other applications 114 may contain software programs, executable by a processor, including a graphical user interface (GUI) configured to provide an interface to the user.

Each user device may further include memory such as database 116 which may include, for example, identifiers such as operating system registry entries, cookies associated with check-in application 112, service application 120, and/or other applications 114, identifiers associated with hardware, or other appropriate identifiers, such as identifiers used for payment/user/device authentication or identification of that user device and/or the associated user. Database 116 may include user device tokens and/or encryption keys, including a public key of service location 130 and/or service provider server 140 for wireless beacon 132. Database 116 may include identifying information for tokens enabling check-in application 112 to identify wireless beacon 132 when receiving a corresponding token. In one embodiment, identifiers in database 116 may be used to associate a user device with a particular account maintained by the account provider. Database 116 may further include online account access information.

Each user device may include a communication module 118 adapted to communicate with wireless beacon 132, service provider server 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may, in some circumstances, communicate directly with wireless beacon 132 without network 170 using short range wireless communications.

Service location 130 may correspond to a physical location visited by local user 102 that offers products and/or services such as targeted assistance, targeted products, and/or targets services for remote user 104. For example, service location 130 may correspond to a merchant storefront, a shopping mall, an amusement park, a concert hall, a sports arena, a museum, a hospital, an airport, a train station, or other location that offers products and/or services. Service location 130 may include a plurality of locations within service location 130, where each location includes a wireless beacon. For example, a location in service location 130 may correspond to an area of a store offering video games for sale. Wireless beacon 132 may check-in local user 102 and/or remote user 104 when user device 180 is in proximity to wireless beacon 132. Thus, wireless beacon 132 may enable service provider server 140 to associate local user 102 and/or remote user 104 with service location 130 and/or a location within service location 130. Service location 130 may be one of a plurality of locations corresponding to service provider server 140. However, in other embodiments, service provider server 140 may correspond only to service location 130. Service location 130 may include a wireless beacon 132 and a communication module 134. In other embodiments, service location 130 may include additional or different software and devices as required.

Wireless beacon 132 may be maintained and/or operated, for example, by service location 130 and/or service provider server 140. Wireless beacon 132 may be implemented using any appropriate hardware and software configured for wireless communication with local user device 180. For example, in one embodiment, wireless beacon 132 may be implemented as a dongle device including a hardware processor and a communication module, for example, connected to device at service location 130. Thus, wireless beacon 132 may be implemented as a device incorporated within or attached to a personal computer (PC), a smart phone, personal digital assistant (PDA), laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with local user device 180 and/or service provider server 140. Although a single beacon is described, a plurality of wireless beacons may be utilized and be location specific within service location 130.

Wireless beacon 132 may include processes, procedures, and/or applications executable by a hardware processor, for example, a software program, configured to interact with local user device 180. Wireless beacon 132 may include applications for transmitting requests to establish a connection between a user device and wireless beacon 132. Thus, wireless beacon 132 may utilize a low energy short range wireless communication of wireless beacon 132 to transmit requests to establish a connection with local user device 180, including an identifier such as a Universally Unique Identifier (UUID). If local user device 180 receives a request to establish the connection with wireless beacon 132 and responds with a user device identifier (potentially including the UUID and other information to effectuate a check-in such as a proxy check-in of local user device 180), wireless beacon 132 may ramp up in power and create a connection between local user device 180 and wireless beacon 132.

Wireless beacon 132 may transmit the request to establish the connection with wireless beacon 132 as a short range communication (e.g. a BLE protocol communication) including a "wake up" process for check-in application 112 of local user device 180 and/or a token for wireless beacon 132 or service provider server 140. In other embodiments, the request and/or connection may utilize near field communication, radio communication, infrared communication, or Bluetooth communication. The request may be specific to local user device 180 by including information that is specific to the corresponding user 102, such as a name, identifier, or user device identifier. The information specific to user 102 may be determined from a user account of local user 102 or other information previously provided to service provider server 140. Thus, in certain embodiments, only a specific local user device 180 will pick up and authenticate the request.

After wireless beacon 132 receives a user device identifier from local user device 180, wireless beacon 132 may determine that local user 102 is at or in proximity to service location 130. Wireless beacon 132 may pass the user device identifier to service provider server 140 and/or payment provider server 160 to complete the proxy check-in process and associate user 102 with service location 130. As shown in FIG. 1, wireless beacon 132 utilizes communication module 134 to pass the information to service provider server 140. However, in other embodiments, wireless beacon 132 may utilize a network connection of wireless beacon 132 through a communication module of wireless beacon 132. Additionally, wireless beacon 132 may keep a communication channel open between user device 180 and service provider server 140 for passing additional information, such as assistance requests, assistance preferences, product and/or service offers, transaction information, payment information, and/or identification information.

In various embodiments, service location 130 includes at least one communication module 134 adapted to communicate with local user device 180, remote user device 110, service provider server 140, and/or payment provider server 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate directly with user device 110 without network 170 using short range wireless communications.

Service provider server 140 may be maintained and/or operated, for example, by one or a plurality of service locations. Generally, service provider server 140 may be maintained by anyone or any entity that establishes and/or maintains a location with services offered to users. In this regard, service provider server 140 may include one or more applications, which may be configured to interact with user device 110 and 180 and/or service location 130 to complete check-in processes for user device 110 and user device 180. Although only one service provider server is shown, a plurality of service provider servers may be utilized. In various embodiments, the check-in and assistance features of service provider server 140 may also be offered by payment provider server 160. Thus, all or part of the described features and processes of service provider server 140 may be incorporated within payment provider server 160.

Service provider server 140 may include a check-in application 142, a service provider application 150, a database 146, and a network interface component 148. Check-in application 142 and service provider application 150 may correspond to processes, procedures, and/or applications executable by a hardware processor, for example, a software program. In other embodiments, service provider server 140 may include additional or different software as required.

Check-in application 142 may correspond to processes to complete a check-in with remote user device 110 and/or local user device 180. Thus, check-in application 142 may correspond to the server side application of service provider server 140 configured to transmit and/or receive check-in requests from user devices 110 and/or 180 and complete the check-in requests. A check-in request may include log-in information for a user account in database 146. Check-in may be completed by verifying the account information. However, in embodiments where a user account has not been previously established and/or service provider server 140 does not offer user account services, check-in application 142 may receive other information for identifying users 102 and/or 104, such as user names/identifiers, user device identifiers, an identifier for an account with another server (e.g., a payment account/payment account identifier with payment provider server 160), or other information.

Once proxy check-in is completed between local user 102 and service provider server 140 and/or remote check-in is completed between remote user 104 and service provider server 140, check-in application 142 may be utilized to associate local user 102 and/or remote user 104 with a location corresponding to wireless beacon 132, such as service location 130 generally, or a sub-location of service location 130 corresponding to wireless beacon 132. Additionally, check-in application 142 may check local user 102 and/or remote user 104 out of the location when local user 102 leaves the proximity of wireless beacon 132. For example, when local user 102 leaves the proximity of wireless beacon 132 so that local user device 180 is no longer in communication with wireless beacon 132, local user 102 and/or remote user 104 may be checked-out of the location.

Service provider server 140 may further include service provider application 150 configured to receive information corresponding to remote user 104 and/or local user 102 checked-in to wireless beacon 132 through service location 130 and provide targeted assistance, products and/or services to remote user 104 and/or to local user 102 on behalf of remote user 104. In this regard, service provider application 150 may receive remote check-in information such as a remote user identifier and/or other information for remote user 104. Utilizing this information, service provider application 150 may determine and provide product and/or service offers to for remote user 104 to local user 102.

The information may also correspond to one or more user accounts of users 102 and/or 104 with another server, such as payment provider server 160. In such embodiments, service provider server 140 may determine a user history or other user information for local user 102 and/or remote user 104 based on information received from payment provider server 160. Payment provider server 160 may provide information about previous purchases/visits by local user 102 and/or remote user 104 at the same or similar locations to service location 130 or may provide other information.

In various embodiments, service provider server 140 may include other applications 144 as may be desired in particular embodiments to provide features to service provider server 140. For example, other applications 144 may include security applications for implementing server-side security features, programmatic server applications for interfacing with appropriate application programming interfaces (APIs) over network 170, or other types of applications. Other applications 144 may contain software programs, executable by a processor, including a graphical user interface (GUI), configured to provide an interface to a user.

Service provider server 140 may include a database 146 which may include, for example, identifiers such as operating system registry entries, cookies associated with check-in application 142 and/or service provider application 150, identifiers associated with hardware of service provider server 140, or other appropriate identifiers, such as identifiers used for payment/user/device authentication or identification. Database 146 may include identifiers and/or user accounts of user 102 and/or user 104, which may comprise an identifier for user 102, user 104, user device 110, and/or user device 180. In various embodiments, identifiers in database 146 may be used by a payment or credit provider, such as payment provider server 160, to associate user 102 and/or user 104 with a particular account maintained by payment provider server 160. For example, an identifier for a payment account with payment provider server 160 may be stored with a user account, an identifier of remote user 104, and/or an identifier of local user 102 in database 146. In other embodiments, a user account stored in database 146 may include a shared identifier with the payment account with payment provider server 160.

In various embodiments, service provider server 140 includes at least one network interface component 148 adapted to communicate with user devices 110, service location 130, and/or payment provider server 160 over network 170. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices Payment provider server 160 may be maintained, for example, by an online payment service provider, which may provide user account and payment services on behalf of user 102, user 104, and/or other users. In this regard, payment provider server 160 may include one or more processing applications, which may provide payment for items using a user account with payment provider server 160. In one example, payment provider server 160 may be provided by PAYPAL®, Inc. of San Jose, Calif., USA. However, in other embodiments, payment provider server 160 may be maintained by or include a merchant, financial services provider, and/or other service provider, which may provide user account services to user 102 and/or user 104. Although payment provider server 160 is described as separate from service provider server 140, it is understood that payment provider server 160 may include services offered by service provider server 140 and vice versa.

Payment provider server 160 may include a transaction processing application 162, a database of user accounts 164, and a network interface component 166. Transaction processing application 162 may correspond to processes, procedures, and/or applications executable by a hardware processor, for example, a software program. In other embodiments, payment provider server 160 may include additional or different software as required.

Transaction processing application 162 may be configured to receive information from one or more of user device 110, user device 180, and/or service provider server 140 for processing and completion of financial transactions such as payment transactions. Transaction processing application 162 may include one or more applications to process financial transactions between user device 110, user device 180, and/or service provider server 140. Financial transactions may include transactions that utilize information such as financial information corresponding to user debit card and/or credit card information, checking account information, a user account (e.g., payment account with payment provider server 160), or other payment information. Transaction processing application 162 may complete a financial transaction for a purchase request by providing payment to service provider server 140 or to an account associated with service provider server 140 and/or service location 130. In various embodiments, transaction processing application 162 may provide transaction histories, including receipts, to user devices 110 and/or 180 in order to provide proof of purchase for an item and/or service. Transaction processing application 162 may also provide the transaction histories to service location 130 for use in pick-up/delivery of the item and/or service.

Additionally, payment provider server 160 may include user accounts 164. As previously discussed, local user 102 and/or remote user 104 may establish one or more user accounts with payment provider server 160. User accounts 164 may include user information, such as a name, an address, a birthdate, payment and/or funding information, additional user financial information, proxy user information such as registered proxy information, and/or other desired user data. Information in user account 164 may be utilized by service provider server 140 to determine and provide targeted assistance, product offers, and/or services offers to local user 102 on behalf of remote user 104.

In various embodiments, payment provider server 160 may include at least one network interface component 166 adapted to communicate with user device 110, service location 130, and/or service provider server 140 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
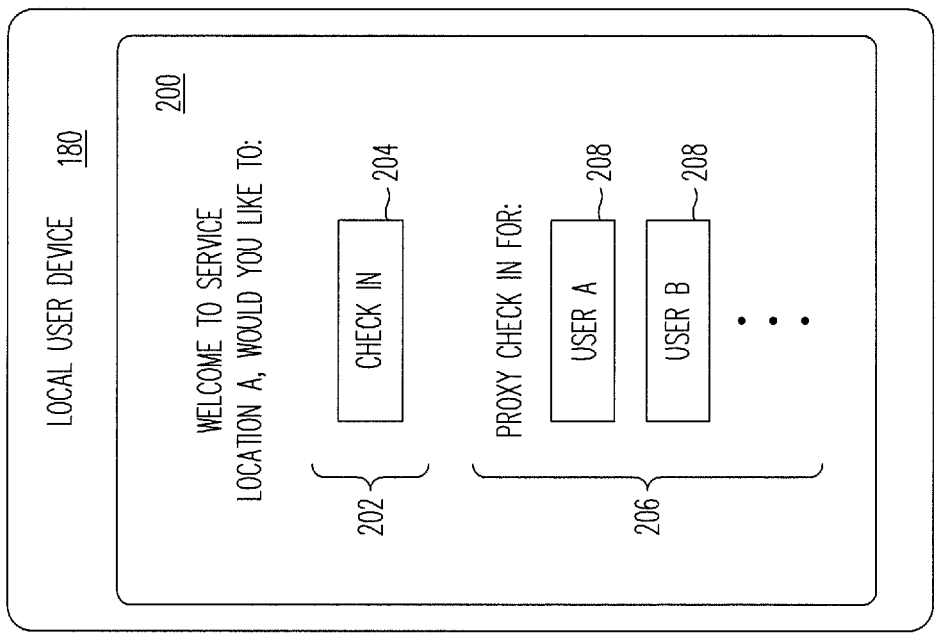
FIG. 2 is a diagram of an illustrative local user device of a proxy user for a remote user, according to an embodiment.

When local user 102 arrives at service location 130, wireless beacon 132 may detect the presence of local user device 180 and, responsive to the detection, local user 102 may be provided with various options for check-in such a proxy check-in to service location 130. FIG. 2 shows an example of check-in options that may be provided to a user such as a local user at a service location using a local user device of the local user.

As shown in FIG. 2, check-in options such as local user check-in option 202 and proxy check-in options 206 may be provided to a user on a user device such as local user device 180. Check-in options 202 and 206 may be provided in a window such as check-in window 200 on a display of local user device 180. For example, window 200 may be a pop-up window generated by an application such as check-in application 112 of user device 180 (see FIG. 1). However, this is merely illustrative. If desired, window 200 may be a portion of a service provider website that the local user has logged into or may be otherwise generated on a display of local user device 180 as would be understood by one skilled in the art.

Local user check-in option 202 may be an option for the local user to request their own check-in to the location. Local user check-in option 202 may include a check-in icon such as a virtual CHECK IN button 204. The local user may request check-in by selecting the CHECK IN button 204 (e.g., using a finger or other instrument on a touch screen or using a mouse-controlled or touchpad-controlled cursor). CHECK IN button 204 may cause a service provider server, a payment provider server, or an application running on local user device 180 to check the local user in to the location.

Proxy check-in options 206 may include one or more options for proxy check in for one or more associated remote users. In the example of FIG. 2, proxy check-in options 206 include text (e.g., "PROXY CHECK IN FOR:") prompting the local user to determine whether they would like to check in as a proxy user for one or more remote users such as a remote user USER A, a remote user USER B, or other remote users. Proxy check-in options 206 may include a virtual proxy check in button 208 corresponding to each remote user for which the proxy user can check in. Remote users such as USER A and/or USER B may be users that have previously designated the user of device 180 as a proxy shopper or may be suggested remote users by a service provider server or a payment provider server (as examples). The local user of local user device 180 may select one or more of buttons 208 (e.g., using a finger or other instrument on a touch screen or using a mouse-controlled or touchpad-controlled cursor). Selecting, for example, a button 208 associated with USER A may forward a check-in alert to that user (e.g., directly from the local user or by requesting that a service provider server or a payment provider server forward the check-in alert).

Figure 3:
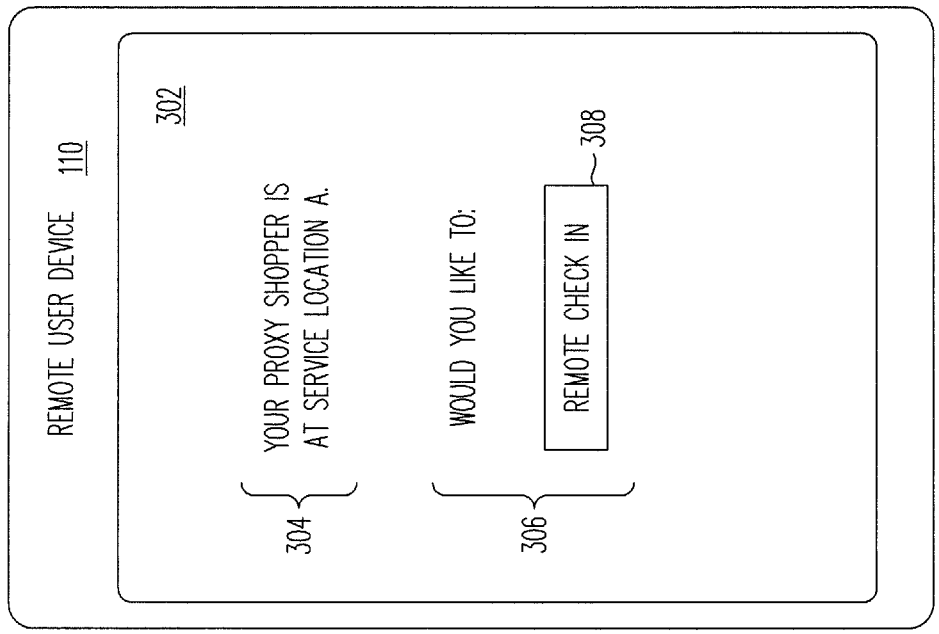
FIG. 3 is a diagram of an illustrative remote user device, according to an embodiment.

Responsive to receiving a check-in forward request when the local user selects a button 208, a service provider server or payment provider server may provide the associated remote user with options for remote check-in. FIG. 3 shows an example of check-in options that may be provided to a user such as a remote user using a remote user device of the remote user.

As shown in FIG. 3, a remote user may be provided with a remote check-in alert that includes, for example, a proxy user location alert and one or more remote check-in options on a device such as remote user device 110. Proxy user location alert 304 and check-in option 306 may be provided in a window such as check-in window 302 on a display of remote user device 110. For example, window 302 may be a pop-up window generated by an application such as check-in application 112 of user device 110 (see FIG. 1). However, this is merely illustrative. If desired, window 302 may be a portion of a service provider website that the remote user has logged into or may be otherwise generated on a display of remote user device 110 as would be understood by one skilled in the art.

Proxy user location alert 304 may include an alert informing the remote user that a proxy user such as a proxy shopper is at a service location such as SERVICE LOCATION A (e.g., a merchant location). The alert may be a visual, audio, mechanical, or other alert and may include for example, text such as "YOUR PROXY SHOPPER IS AT SERVICE LOCATION A."

Remote check-in option 306 may include text (e.g., "WOULD YOU LIKE TO:") prompting the user of remote user device 110 to determine whether they would like to remotely check in using, for example, a check-in icon such as a virtual REMOTE CHECK IN button 308. Remote check-in may be requested by the remote user by selecting the REMOTE CHECK IN button 308 (e.g., using a finger or other instrument on a touch screen or using a mouse-controlled or touchpad-controlled cursor). REMOTE CHECK IN button 204 may cause service provider server, payment provider server, or an application running on remote user device 110 to remotely check the remote user in to the location and/or to proxy check-in the local user to the location.

Figure 4:
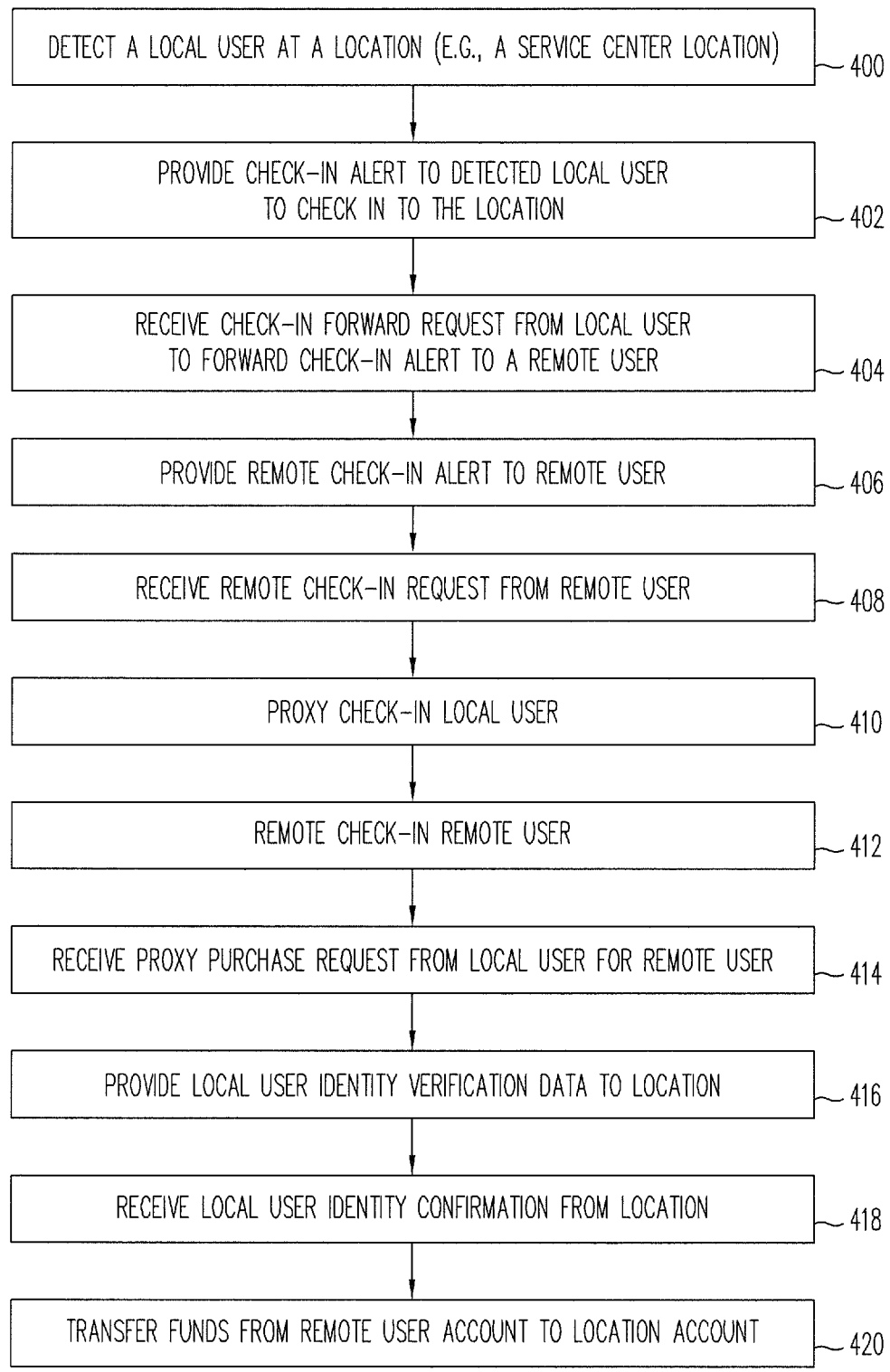
FIG. 4 is a flowchart of an exemplary process to provide remote check-in, according to an embodiment.

FIG. 4 is a flowchart of an exemplary process to provide remote user check-in and associated proxy shopping operations for a remote user by a system of the type described herein, according to an embodiment.

At step 400, a local user may be detected at a location (e.g., a service center location). The local user may be detected based on communication between a local user device and a wireless beacon at the location or based on check-in information transmitted to a service provider server or payment provider server from the local user device when the local user is located at the location. The local user device may be in communication with the beacon when the local user device is in proximity to the beacon. The local user device and the beacon may be in communication using one of near field communication, radio communication, infrared communication, Bluetooth communication, and Bluetooth low energy communication.

At step 402, a check-in alert may be provided to the detected local user to check in to the location. The check-in alert may include a local user check-in option and/or one or more proxy check-in options to check in as a proxy user for a remote user. The check-in alert may be generated and provided to the detected location user in response to detecting the local user.

At step 404, a check-in forward request may be receive from the local user to forward a check-in alert to a remote user. The check-in forward request may be received when the local user selects a proxy check-in option using the local user device.

At step 406, a remote check-in alert may be provided to the remote user. The remote check-in alert may be provided to the remote user directly from the local user device or from a service provider server or a payment provider server responsive to receiving the check-in forward request from the local user.

At step 408, a remote check-in request may be received from the remote user. The remote check-in request may be a request from the remote user to remotely check in to the location and may be received when the remote user selects a remote check-in option using the remote user device.

At step 410, proxy check-in of the local user may be completed. Proxy check-in of the local user may include checking the local user into the location as a proxy user such as a proxy shopper for the remote user. Proxy check-in of the local user may include providing information, product offers, service offers or other assistance to the local user on behalf of the remote user (e.g., offering a product for the remote user to the local user).

At step 412, remote check-in of the remote user may be completed. Remote check-in of the remote user may include checking the remote user into the location even though the remote user is located away from the location. Remote check-in of the remote user may include providing information about the location, available product information, product offers, service offers or other assistance to the remote user for purchase by the local user on behalf of the remote user using a payment account of the remote user. In various embodiments, a remotely checked-in user may actively participate in a shopping process by communication with the local user. However, this is merely illustrative. In some embodiments, the proxy shopper may have the ability to shop on behalf of the remote user without active input from the remote user.

At step 414, a proxy purchase request may be received from the local user for the remote user. For example, the local user may have identified a product that the remote user desires (e.g., based on direct communication with the remote user before or after the check-in operations, based on a list of the remote user, based on recommendations for the remote user, and/or based on personal knowledge of the local user about the remote user). The proxy purchase request may be received when, for example, the local user attempts to pay for a product or a service at the location.

At step 416, local user identification data such as a photograph or other identifying information of the local user may be provided (e.g., by a service provider server or a payment provider server) to the service location for verification by the service location that the proxy user is authorized to make purchases on behalf of the remote user.

At step 418, identity confirmation of the local user may be received (e.g., from the service location when the service location verifies the identity of the local user using the provided local user identification data).

At step 420, funds may be transferred (e.g., by a payment provider server) from a remote user account of the remote user to a location account (e.g., a service provider account such as a merchant account) associated with the location. In this way, a system may facilitate a purchase of a product or service by the local user for the remote user.

One or more of the processes and steps described in connection with FIG. 4 may be performed in any suitable order, omitted, and/or repeated any suitable number of times for facilitating remote check-in and associated proxy shopping processes.

Figure 5:
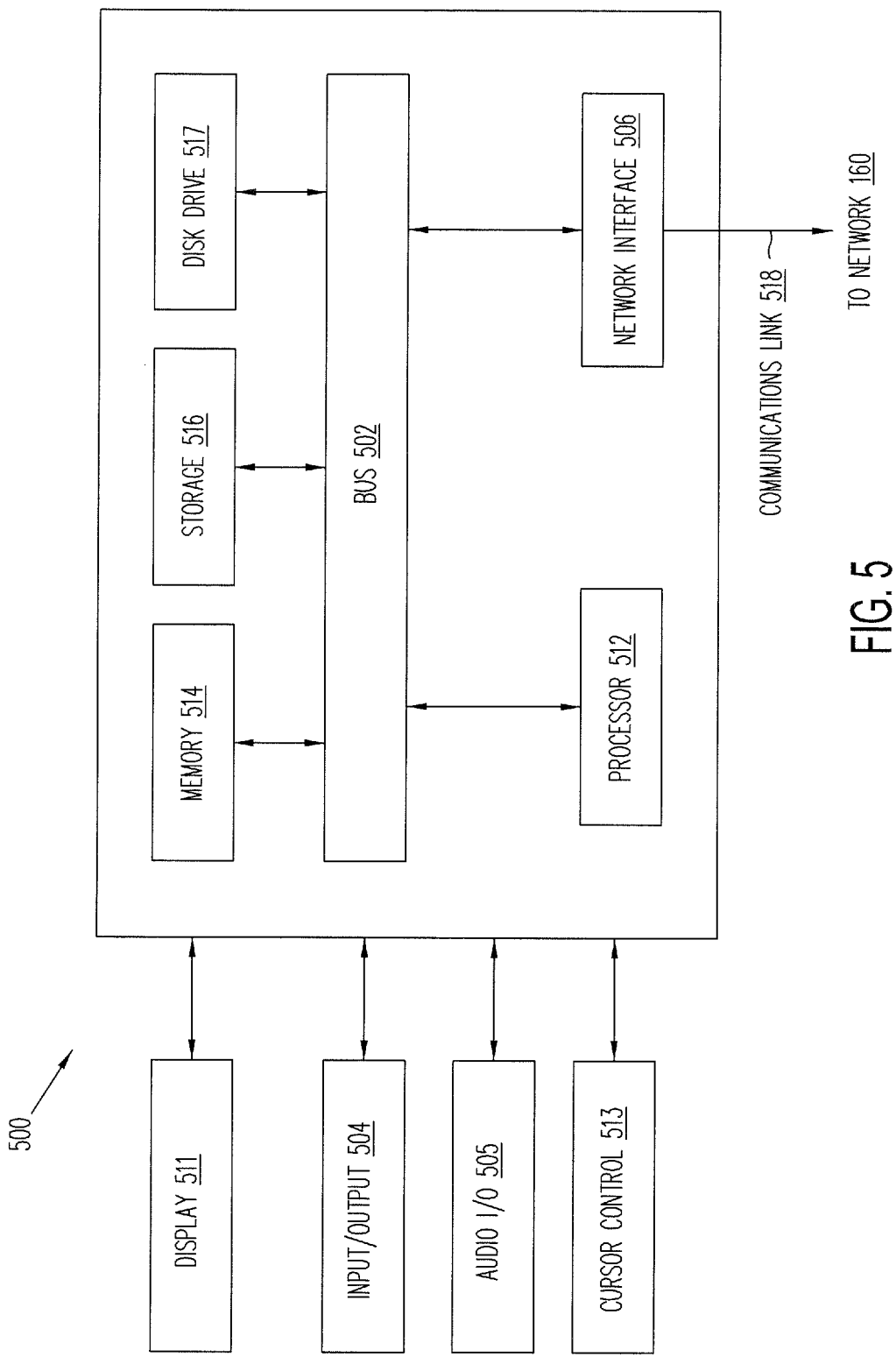
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, via a first network from a first electronic device associated with a first user located outside a predetermined distance of a first location, a remote check-in request for remotely checking-in at the first location;
determining a second electronic device associated with a second user who has been pre-designated by the first user as a proxy user for the first user;
determining, using information obtained from a beacon corresponding to the first location, whether the second electronic device is located within the predetermined distance of the first location;
in response to receiving the remote check-in request and a determination that the second electronic device is located within the predetermined distance of the first location, transmitting, via a second network, a proxy check-in alert to the second electronic device;
in response to receiving from the second electronic device a confirmation to proxy check-in for the first user, (i) establishing a connection with the second electronic device via the second network to provide location-based services to the second electronic device based on a user account of the first user and (ii) establishing a connection with the first electronic device via the first network to provide location-based services to the first electronic device based on a location of the second electronic device; and
performing a location-dependent transaction with the second electronic device using the user account of the first user based on the location of the second electronic device.

2. The system of claim 1, wherein the location-dependent transaction comprises a payment transaction using the user account of the first user.

3. The system of claim 2, wherein the operations further comprise transferring funds from the user account of the first user to an account associated with the first location for the payment transaction.

4. The system of claim 1, wherein the first location comprises a service location of a service provider.

5. The system of claim 4, wherein the service provider comprises a merchant.

6. The system of claim 1, wherein the determining whether the second electronic device is within the predetermined distance of the first location comprises receiving an identifier associated with the second electronic device from the beacon when the second electronic device is in communication with the beacon.

7. The system of claim 6, wherein the second electronic device communicates with the beacon using one of a near field communication technology, a radio communication technology, an infrared communication technology, a Bluetooth communication technology, or a Bluetooth low energy communication technology.

8. A method for electronically checking in a user, the method comprising:
receiving, via a first network from a first electronic device associated with a first user located outside a predetermined distance of a first location, a remote check-in request for remotely checking in at the first location;
determining, by one or more hardware processors, a second electronic device associated with a second user who has been pre-designated by the first user as a proxy user for the first user;
determining, by the one or more hardware processors, whether the second electronic device is located within the predetermined distance of the first location based on information obtained from a beacon corresponding to the first location;
in response to receiving the remote check-in request and a determination that the second electronic device is located within the predetermined distance of the first location, transmitting, via a second network by the one or more hardware processors, a proxy check-in alert to the second electronic device;
in response to receiving, from the second electronic device by the one or more hardware processors, a confirmation to proxy check-in for the first user, (i) establishing a connection with the second electronic device via the second network to provide location-based services to the second electronic device based on a user account of the first user and (ii) establishing a connection with the first electronic device via the first network to provide location-based services to the first electronic device based on a location of the second electronic device; and
performing, by the one or more hardware processors, a location-dependent transaction with the second electronic device using the user account of the first user based on the location of the second electronic device.

9. The method of claim 8, wherein the determining the second electronic device comprises receiving an identifier associated with the second electronic device from the first electronic device.

10. The method of claim 9, wherein the determining whether the second electronic device is located within the predetermined distance of the first location comprises receiving the identifier from the beacon corresponding to the first location when the second electronic device is in communication with the beacon.

11. The method of claim 8, further comprising:
receiving a proxy purchase request from the second electronic device based on the user account of the first user; and
transferring funds from the user account of the first user to an account associated with the first location.

12. The method of claim 11, further comprising:
prior to the transferring, receiving identity verification data associated with the second user; and
verifying an identity of the second user based on the received identity verification data.

13. A non-transitory machine readable medium having stored thereon a plurality of machine-readable instructions executable to cause a machine to perform operations comprising:
- receiving, via a first network from a first electronic device associated with a first user located outside a predetermined distance of a first location, a remote check-in request for remotely checking in at the first location;
- determining a second electronic device associated with a second user who has been pre-designated by the first user as a proxy user for the first user;
- determining, using information obtained from a beacon corresponding to the first location, whether the second electronic device is located within the predetermined distance of the first location;
- in response to receiving the remote check-in request and a determination that the second electronic device is located within the predetermined distance of the first location, transmitting, via a second network, a proxy check-in alert to the second electronic device;
- in response to receiving from the second electronic device a confirmation to proxy check-in for the first user, (i) establishing a connection with the second electronic device via the second network to provide location-based services to the second electronic device based on a user account of the first user and (ii) establishing a connection with the first electronic device via the first network to provide location-based services to the first electronic device based on a location of the second electronic device; and
- performing a location-dependent transaction with the second electronic device using the user account of the first user based on the location of the second electronic device.

14. The non-transitory machine readable medium of claim 13, wherein the operations further comprise transmitting an offer of a product to the first electronic device based on the location of the second electronic device.

15. The non-transitory machine readable medium of claim 14, wherein the location-dependent transaction comprises a purchase of the product using the user account of the first user.

* * * * *